United States Patent [19]

Klassen et al.

[11] Patent Number: 4,595,340
[45] Date of Patent: Jun. 17, 1986

[54] GAS TURBINE BLADED DISK ASSEMBLY

[75] Inventors: David D. Klassen, Boxford; Douglas B. Ballantyne, Marblehead, both of Mass.

[73] Assignee: General Electric Company, Lynn, Mass.

[21] Appl. No.: 635,958

[22] Filed: Jul. 30, 1984

[51] Int. Cl.⁴ .............................................. F01D 5/30
[52] U.S. Cl. .................. 416/193 A; 416/248
[58] Field of Search ............... 416/193 A, 193 R, 248, 416/244 A

[56] References Cited

U.S. PATENT DOCUMENTS

| | | |
|---|---|---|
| 2,656,146 | 10/1953 | Sollinger . |
| 3,112,557 | 12/1963 | Kent . |
| 3,395,891 | 8/1968 | Burge . |
| 3,458,119 | 7/1969 | Shaw ........................... 416/193 A X |
| 3,810,711 | 5/1974 | Emmerson . |
| 3,819,008 | 6/1974 | Evans et al. ................. 416/193 A X |
| 3,832,090 | 8/1974 | Matto ........................... 416/193 A X |
| 3,871,791 | 3/1975 | Guy et al. ........................ 416/193 A |
| 4,265,594 | 5/1981 | Eggmann ........................ 416/193 A |
| 4,265,595 | 5/1981 | Bucy . |
| 4,343,593 | 8/1982 | Harris ............................. 416/193 A |
| 4,363,602 | 12/1982 | Martin . |

FOREIGN PATENT DOCUMENTS

| | | | |
|---|---|---|---|
| 69423 | 6/1981 | Japan ............................... 416/193 A |
| 281549 | 7/1952 | Switzerland ..................... 416/193 A |
| 653267 | 5/1951 | United Kingdom ................ 416/248 |
| 872705 | 7/1961 | United Kingdom ........... 416/193 A |

OTHER PUBLICATIONS

General Electric, Aircraft Engine Business Group, Design Practice DP7004, Apr. 30, 1984, pp. 150 to 151.
Report AFAPL-TR-76-92, "Investigation of . . . Compressor with Low Hub/Tip Ratio,"-A. J. Wennerstrom, et al., Oct. 1976; 8 selected pp. including iii, 34, 36 & 48.
Report AFAPL-TR-76-59, "Design of . . . Compressor with Low Hub/Tip Ratio,"-A. J. Wennertrom et al., Oct. 1976, cover page & p. 29.

Primary Examiner—Everette A. Powell, Jr.
Attorney, Agent, or Firm—Francis L. Conte; Derek P. Lawrence

[57] ABSTRACT

Disclosed is a bladed disk assembly having a new and improved rotor blade. The blade includes a shank and dovetail extending from an airfoil portion thereof. The shank includes a pocket extending therein from an end surface thereof. The shank pocket allows for reduced weight of the blade while maintaining acceptable bending stiffness thereof. In an exemplary embodiment of the invention, the bladed disk assembly is effective for being interchangeable with a blisk assembly having an inlet hub radius ratio of about less than about 0.5 and a root solidity of greater than about 2.2.

21 Claims, 7 Drawing Figures

GAS TURBINE BLADED DISK ASSEMBLY

The Government has rights in this invention pursuant to Contract No. DAAK51-83-C-0014 awarded by the United States Department of the Army.

BACKGROUND OF THE INVENTION

This invention relates generally to gas turbine engine rotor blades, and, more specifically, to blades and bladed disk assemblies of fan and compressor sections thereof.

Bladed disk assemblies, i.e., discrete blades having dovetails mounted in complementary shaped slots in a rotor disk, are well known in the art. Blisk assemblies having integral blades and disks i.e. bl(ade) plus integral (d)isk equals "blisk", see for example, U.S. Pat. No. 4,363,602-J. R. Martin, entitled "Composite Air Foil and Disc Assembly," are also well known in the art. The use of a blisk assembly over a bladed disk assembly provides many benefits including increased structural strength and improved aerodynamic performance. In particular, a blisk can be designed for obtaining a relatively low radius ratio, defined as the inlet hub radius divided by the blade tip radius, having values less than about 0.5, and relatively high blade root solidity, defined as the root chord length divided by the distance between adjacent blades, having values greater than about 2.3 for obtaining significant improvements in aerodynamic performance.

For example, a development engine of the General Electric Company includes a stage 1 titanium compressor blisk having a radius ratio of about 0.42 and a solidity of about 3.1. Although this blisk provides substantial performance benefits, it is deemed desirable to have replaceable blades for more easily repairing any foreign object damage thereto. Furthermore, the use of conventional blade steel material is also deemed desirable for reducing costs.

However, experience has shown that conventional steel-bladed disk assemblies are limited to radius ratios greater than about 0.5 and solidity less than about 2.2 due to life and strength considerations including low-cycle fatigue (LCF) and high-cycle fatigue (HCF). It should be appreciated that for any given compressor stage, the number and size of the blades needed for performing the required amount of work is generally a fixed requirement. With this given number of blades, it will be appreciated that for obtaining reduced radius ratios to improve aerodynamic performance, the outer perimeter of the disk must be correspondingly reduced, thusly providing less circumferential space for mounting the blades thereto and thereby increasing solidity.

Accordingly, smaller shank and dovetail portions of the blade are required due to the physical limitations of the decreased circumference for low radius ratio applications. However, inasmuch as the size of the airfoil portion of the blade does not basically change, the required smaller conventional dovetail and shank are structurally inadequate for suitably mounting the blade to the disk. For example, such a conventional shank and dovetail would be relatively more flexible and have less load transfer surface areas thus leading to undesirable LCF and HCF problems in the dovetail and disk assembly.

Accordingly, it is an object of the present invention to provide a new and improved bladed disk assembly.

Another object of the present invention is to provide a bladed disk assembly which is interchangeable with a blisk assembly having a relatively low radius ratio and relatively high solidity.

Another object of the present invention is to provide a new and improved rotor blade having an improved shank portion.

Another object of the present invention is to provide an improved rotor blade having shank and dovetail portions which are relatively lighter than conventional ones while maintaining acceptable bending stiffness and load-carrying ability.

Another object of the present invention is to provide an improved rotor blade having reduced weight to minimize stress concentration effects.

SUMMARY OF THE INVENTION

The invention comprises a bladed disk assembly having a new and improved rotor blade. The blade includes a shank and dovetail extending from an airfoil portion thereof. The shank includes a pocket extending therein from an end surface thereof. The shank pocket allows for reduced weight of the blade while maintaining acceptable bending stiffness thereof. In an exemplary embodiment of the invention, a steel-bladed disk assembly is effective for being interchangeable with a titanium blisk assembly having an inlet radius ratio of less than about 0.5 and a solidity of greater than about 2.2.

BRIEF DESCRIPTION OF THE DRAWINGS

The novel features believed characteristic of the invention are set forth in the appended claims. The invention, itself, together with further objects and advantages thereof, is more particularly described in the following detailed description taken in conjunction with the accompaning drawings in which:

DETAILED DESCRIPTION

Figure 1:
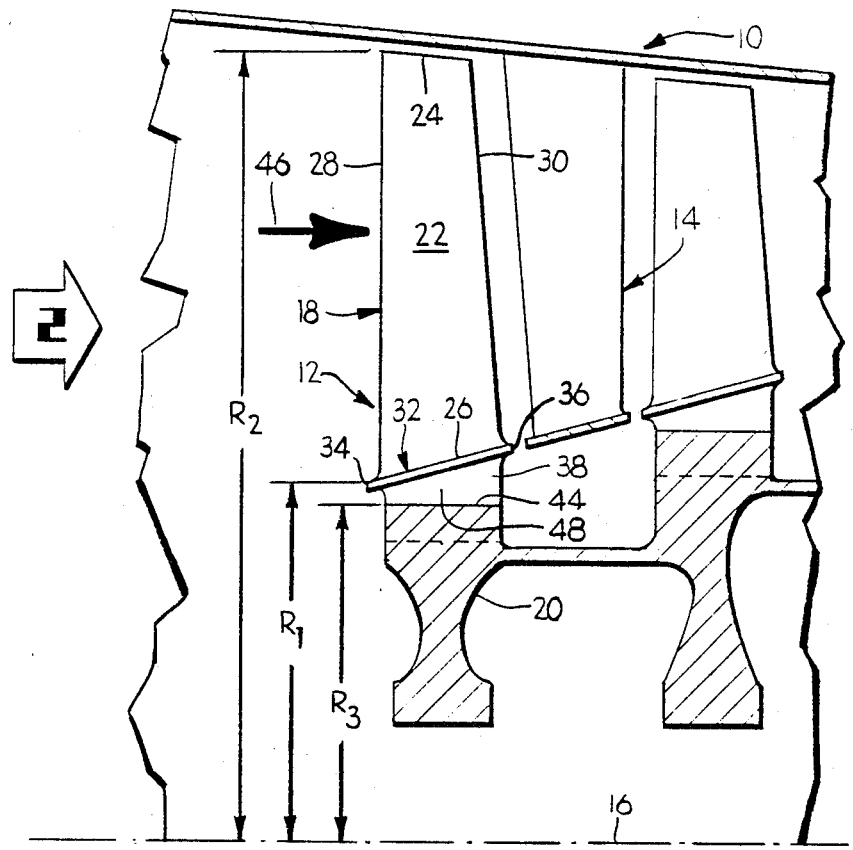
FIG. 1 is a partly sectional view of a compressor of a gas turbine engine according to one embodiment of the present invention.

Illustrated in FIG. 1 is a portion of a compressor 10 of a gas turbine engine. The compressor 10 includes an inlet, first stage bladed disk assembly 12 disposed upstream of and coaxially with a plurality of circumferentially spaced stator vanes 14 about an engine or compressor longitudinal centerline 16. The bladed disk assembly 12 includes a plurality of circumferentially spaced rotor blades 18 attached to a rotor disk 20.

Figure 2:
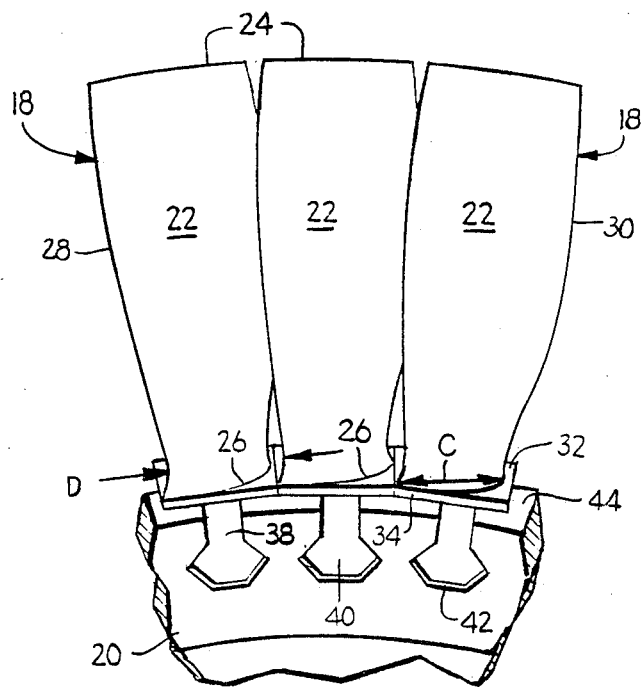
FIG. 2 is an end view of the bladed disk assembly of the compressor illustrated in FIG. 1 viewed from the direction as indicated by arrow 2.

More specifically, and referring to both FIGS. 1 and 2, the blade 18 includes a relatively thin, solid airfoil portion 22 having a tip 24, a root 26, a leading edge 28, and a trailing edge 30. The blade 18 further includes a generally rectangular platform 32 extending laterally outwardly from the airfoil root 26. The platform 32 is relatively highly sloped, in the range of about 20 to about 35 degrees, upwardly toward the tip 24, from the leading edge 28 to the trailing edge 30, and provides an inner airflow boundary in the compressor 10. The platform 32 includes an upstream, forward end 34 and a downstream aft end 36, the aft end 36 being disposed at a radius greater than that of the forward end 34. The blade 18 also includes a shank 38 extending coaxially from the airfoil 22 at the platform 32, and a conventionally shaped axial entry dovetail 40 extending from the shank 38.

The disk 20 includes a plurality of axially disposed circumferentially spaced slots 42 in an outer perimeter 44 thereof which are complementary in shape to the blade dovetails 40, and which receive the dovetails 40 for attaching the blades 18 thereto. Air 46 is suitably channeled through the blades 18 and the vanes 14 and is compressed thereby.

The blades 18 have an inlet hub radius ratio $R_1/R_2$ defined with respect to the centerline 16, which is equal to the hub radius $R_1$ of the blade 18 defined at the intersection of the blade leading edge 28 and the platform 32 divided by the radius $R_2$ of the blade tip 24 at the leading edge 28. The radius $R_3$ of the disk outer perimeter 44 is appropriately less than the hub radius $R_1$ for accommodating the platform 32, shank 38 and the dovetail 40.

The blades 18 are circumferentially spaced a distance D between adjacent leading edges 28 at the root 26. Each blade 18 has a chord of length C extending from the leading edge 28 to the trailing edge 30 at the root 26. Blade root solidity is defined as the ratio C/D and is a non-dimensional indication of, and is directly proportional to, the centrifugal loads which must be suitably accommodated by each disk slot 42. Relatively large values of solidity indicate that each disk slot 42 will receive relatively large centrifugal loads from the blade 18 through the dovetail 40. Experience has shown that for maintaining sufficient LCF and HCF life limits in the shank 38, dovetail 40, and slots 42 the use of conventional bladed disk assemblies is limited to solidity values up to about 2.4.

The bladed disk assembly 12 according to one embodiment of the present invention includes new and improved features which allow for reduced inlet radius ratios and increased solidity as compared to conventional bladed disk assemblies for obtaining improved aerodynamic performance while providing acceptable life and stress levels of the assembly. More specifically, a steel-bladed disk assembly 12 preferably has a radius ratio of less than about 0.5 for solidity values of greater than about 2.2, and with sloped platforms 26 of greater than about 20 degrees. These values allow the steel-bladed disk assembly 12 to replace a similarly dimensioned blisk assembly for obtaining the improved aerodynamic performance benefits of the titanium blisk assembly while allowing for individual blade removal for repairing any foreign object damage that might occur.

Examples of conventional fan and compressor bladed disk assemblies are disclosed in U.S. Pat. No. 4,265,595—R. W. Bucy et al, entitled "Turbomachinery Blade Retaining Assembly," and U.S. Pat. No. 3,395,891—J. C. Burge et al, entitled "Lock for Turbomachinery Blades," both assigned to the present assignee. These conventional rotor blades include an airfoil, a sloped platform, a shank and a dovetail. The conventional shank is a solid member having a substantially rectangular cross section.

In order to use such a conventional blade in a steel-bladed disk assembly having radius ratios less than about 0.5 and solidity greater than about 2.2, and highly sloped platforms of about 20 degrees to about 35 degrees, the shank would have to be made relatively radially longer, in particular at its aft end, for properly fitting the blade to the disk, which would therefore undesirably increase shank weight and flexibility. The shank and dovetail would also be made thinner and smaller for fitting in the reduced disk outer perimeter and for reducing weight to avoid LCF life limits in the dovetail region. However, reducing the thickness of a conventional shank decreases the shank's moment of inertia, or bending stiffness, thereby creating undesirable HCF life limits due to the well-known first flexural mode of vibration at the 2/rev excitation frequency.

Figure 3A:
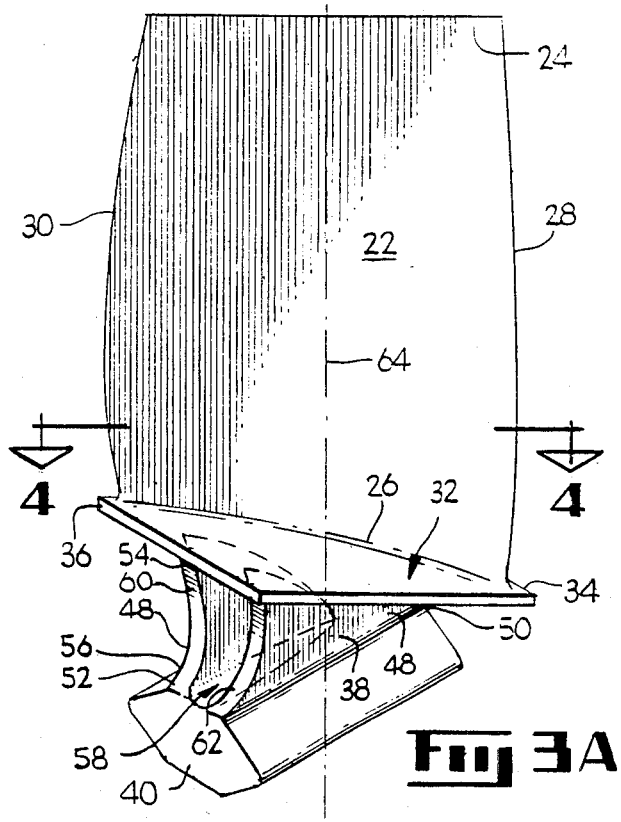
FIG. 3A is an isometric view of one of the rotor blades illustrated in FIG. 1 as viewed from a downstream direction.
Figure 3B:
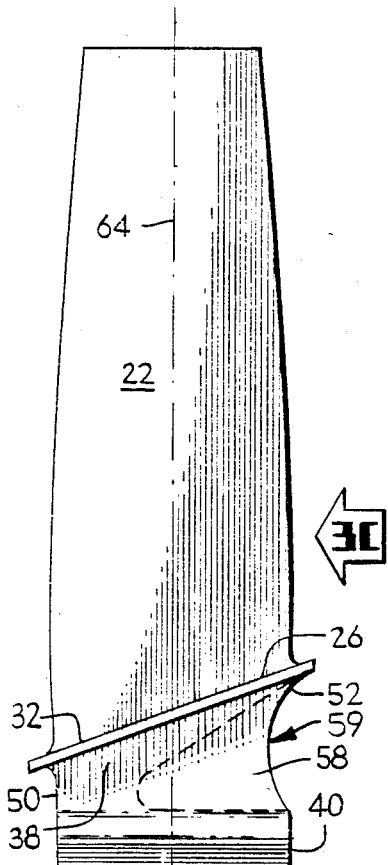
FIG. 3B is a side view of the blade illustrated in FIG. 3A.
Figure 3C:
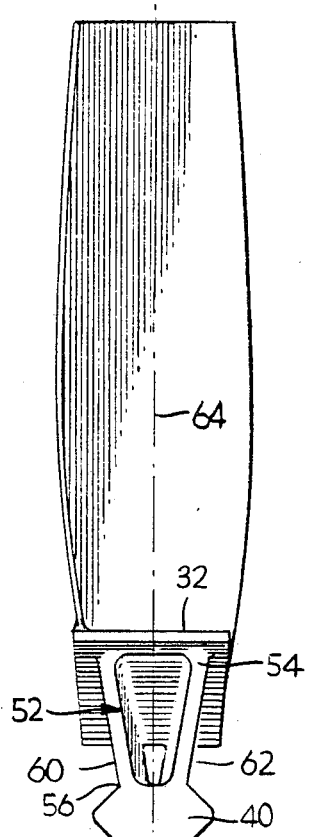
FIG. 3C is an aft end view of the blade illustrated in FIG. 3A.

According to one embodiment of the present invention as illustrated in more particularity in FIGS. 3A, 3B and 3C, the blade 18 includes an improved shank 38 having reduced weight while maintaining acceptable bending stiffness.

More specifically, the shank 38 includes two oppositely facing lateral surfaces 48 disposed in a direction substantially tangential with respect to the disk 20 of FIG. 1, and first and second oppositely facing end surfaces 50 and 52, respectively, the first end surface 50 facing in an upstream direction and the second end surface 52 facing in a downstream direction. The first and second end surfaces 50 and 52 are generally aligned with the leading and trailing edges 28 and 30 respectively.

The shank 38 is generally rectangular in cross section with the lateral surfaces 48 being wider than the end surfaces 50 and 52 so that the shank 38 is longer in an axial direction than it is wide in the tangential direction. The shank 38 also includes a radially outer end 54 fixedly joined to the platform 32 and being sloped parallel thereto. A radially inner end 56 of the shank 38 is fixedly joined to the dovetail 40.

According to an exemplary embodiment of the present invention, the downstream second end surface 52 of the shank 38, which is longer in the radial direction than the upstream first end 50, includes a recess or pocket 58 extending into the shank 38 toward the shank first end surface 50. In particular, the pocket 58 extends from center portion 59 of the second end surface 52 towards the first end surface 50 and between the dovetail 40 and the airfoil root 26 at the platform 32 (see FIG. 3B). The pocket 58 is preferably generally triangular in shape with its base disposed at the shank second end surface 52 and its apex pointed toward the shank first end surface 50. The pocket 58 in the shank second end surface 52 thereby defines first and second laterally spaced legs 60 and 62, respectively, which extend in a generally longitudinal or radial direction from the platform 32 to the dovetail 40.

The pocket 58 allows for reduced weight of the shank 38 without significantly reducing the bending stiffness of the shank 38. In particular, by providing the pocket 58, the first and second legs 60 and 62 can be, and are, preferably spaced farther apart at the shank outer end 54 near the platform 32 than at the shank inner end 56 near the dovetail 40.

This arrangement allows for increased bending stiffness in the shank 38 without an undesirable increase in weight. Reduced weight of the shank 38 is significant inasmuch as LCF damage is directly proportional to weight. Maintaining bending stiffness or increasing bending stiffness is significant for controlling the frequency response of the blade 28, in particular, the 2/rev response, for maintaining an acceptable frequency margin for obtaining acceptable HCF life limits. Furthermore, the weight of the shank 38 is reduced by using the relatively simple pocket 58 which does not introduce any substantial stress concentrations which would otherwise be introduced by conventional lightening holes.

For further reducing the weight of the shank 38 without significantly decreasing the bending stiffness thereof, the shank second end surface 52 has a concave shape wherein the center portion 59 thereof is spaced closer to the shank first end surface 50, thereby eliminating weight due to the material in the first and second legs 60 and 62 which would otherwise exist if the second end surface 52 were substantially straight.

Of course, it should be appreciated that the pocket 58 allows for a decrease in overall size of the shank 38 and the dovetail 40 to allow for a reduction in the inlet radius ratio while maintaining acceptable HCF and LCF life limits.

Figure 4:
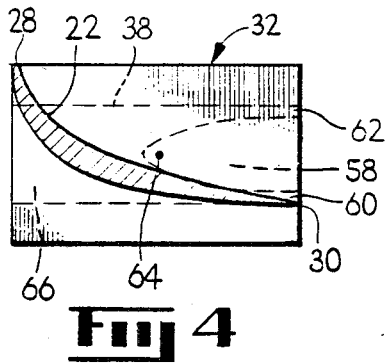
FIG. 4. is a sectional top view of the blade illustrated in FIG. 3A taken along line 4—4.

FIG. 4 illustrates a preferred alignment of the airfoil 22 with respect to the shank 38. In particular, the cresent-shaped airfoil 22 is generally aligned with respect to a blade longitudinal, radial axis 64 (see FIGS. 3B and 3C) so that the airfoil 22 is disposed radially outwardly of substantially only the first leg 60 and a solid forward portion 66 of the shank 38. This allows for a generally straight load path from the airfoil 22 to the dovetail 40 without introducing additional undesirable bending stresses which would otherwise occur if the airfoil 22 were misaligned with the first leg 60.

Inasmuch as the pocket 58 extends only partly into the shank 38, adequate cross-sectional area is maintained in the shank forward portion 66 and the first leg 60 for carrying the centrifugal loads of the airfoil 22 and platform 32 to the dovetail 40. The second leg 62 carries a portion of this load but is more importantly effective for maintaining acceptable bending stiffness of the shank 38.

Of course, acceptable radius ratios $R_1/R_2$ and solidity C/D for the bladed disk assembly 12 are a function of materials chosen and their strength to weight ratios. For example, conventionally used steel for fan or compressor blades, e.g., AMS 5743, limits acceptable radius ratios $R_1/R_2$ for conventional shank/dovetail designs to greater than or equal to about 0.5, with a root solidity value of less than about 2.2. However, in accordance with the present invention, a radius ratio $R_1/R_2$ of less than about 0.5 and, in particular, of about 0.42 has been obtained in a steel-bladed disk assembly 12, with a root solidity of greater than about 2.2, and, in particular, about 3.1, and a platform slope of about 30 degrees.

Conventional fan and compressor blades manufactured from titanium, e.g., AMS 4928, allow for a radius ratio $R_1/R_2$ of greater than or equal to about 0.34 and a solidity of less than about 2.3. However, with the use of the present invention, radius ratios $R_1/R_2$ of substantially less than 0.34 should be obtainable for the bladed disk assembly 12 having a root solidity of greater than about 2.3, and, in particular, about 3.5 when manufactured from titanium.

Figure 5:
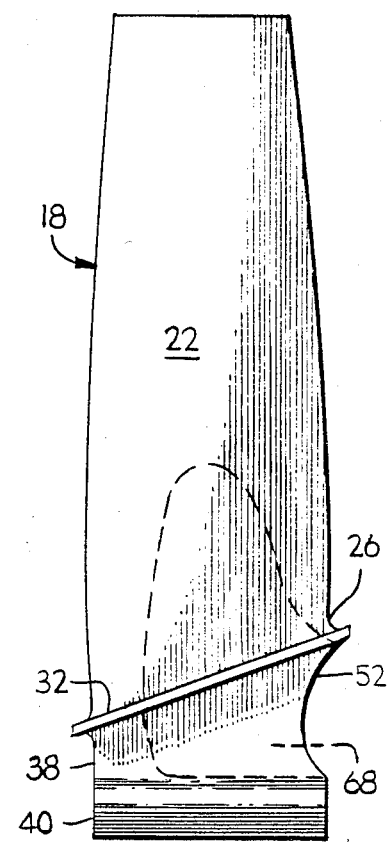
FIG. 5 is a side view of a rotor blade according to another embodiment of the present invention.

Illustrated in FIG. 5 is another embodiment of the present invention having a pocket 68 which extends from the downstream second end surface 52 into the shank 38 and then through the platform 32 and partially into the airfoil 22 near the airfoil root 26. Inasmuch as the airfoil 22 is generally a relatively thin structure, the provision of the pocket 68 in the radially lower end thereof, where the airfoil 22 is typically thicker, or may be made thicker to incorporate the pocket 68, does not adversely affect aerodynamic performance, yet allows for further weight savings.

Accordingly, it will be appreciated from the teachings herein that the bladed disk assembly 12 including the pocket 58 in the blade shank 38 results in a lighter blade 18 having a bending stiffness generally equal to or greater than that which would otherwise be realizable without the pocket 58. Accordingly, in many applications, the present invention allows for the substitution of the bladed disk assembly 12 for a similarly sized conventional blisk assembly which results in the aerodynamic performance benefits due to low radius ratios while allowing for relatively easy blade removal for repairing foreign object damage which might occur. The invention may also be practiced in otherwise conventional bladed disk assemblies for obtaining reduced weight while maintaining bending stiffness for improving LCF and HCF life considerations.

While there have been described herein what are considered to be preferred embodiments of the present invention, other modifications will occur to those skilled in the art from the teachings herein.

Having thus described the invention, what is desired to be secured by Letters Patent of the United States is:

1. A gas turbine engine blade comprising:
   an airfoil having a root;
   a shank extending from said airfoil root; and
   a dovetail extending from said shank;
   said shank having two oppositely facing lateral surfaces, and first and second oppositely facing end surfaces, said lateral surfaces being wider than said end surfaces, and said shank second end surface including a pocket extending therein toward said shank first end surface and between said dovetail and said airfoil root, said pocket defining first and second laterally spaced and longitudinally extending legs, said shank including a solid forward portion extending from said first surface to said pocket, said airfoil being generally aligned with respect to a longitudinal axis of said blade along substantially only said first leg and said solid forward portion for providing a generally straight load path from said airfoil to said dovetail.

2. A blade according to claim 1 wherein said airfoil has a tip, a leading edge and a trailing edge, and said blade further includes a platform extending outwardly from said airfoil root and being sloped upwardly toward said airfoil tip from said leading edge to said trailing edge, and wherein said shank has an outer end joining said platform and sloped parallel thereto and wherein said shank pocket extends in a direction from said trailing edge toward said leading edge.

3. A gas turbine engine rotor blade comprising:
   an airfoil having a tip, a root, a leading edge, and a trailing edge;
   a generally rectangular airflow bounding platform joined to said airfoil root and being sloped upwardly toward said airfoil tip from said leading edge toward said trailing edge;
   a shank extending from said platform; and
   a dovetail extending from said shank;
   said shank having two oppositely facing lateral surfaces, and first and second oppositely facing end surfaces being generally aligned with said airfoil leading edge and trailing edge, respectively, said shank second end surface including a pocket extending therein toward said first end surface and between said platform and said dovetail, said pocket defining first and second laterally spaced and longitudinally extending legs, said shank including a solid forward portion extending from said first surface to said pocket, said airfoil being generally aligned with respect to a longitudinal axis of said blade along substantially only said first leg and said solid forward portion for providing a generally straight load path from said airfoil to said dovetail.

4. A blade according to claim 3 wherein said pocket is generally triangular in shape and said first and second spaced legs extend from said platform to said dovetail.

5. A blade according to claim 4 wherein said first and second legs are spaced farther apart at said platform than at said dovetail for providing increased bending stiffness in said shank.

6. A blade according to claim 4 wherein said shank second end surface has a concave shape being closer to said shank first end surface at a center portion thereof.

7. A blade according to claim 3 wherein said pocket further extends through said platform and into said airfoil.

8. A bladed disk assembly for a gas turbine engine comprising:
 a disk having a plurality of circumferentially spaced axially disposed slots therein; and
 a plurality of rotor blades each including an airfoil, a platform, a shank, and a dovetail, said airfoil including a tip, a root at said platform, a leading edge and a trailing edge, said shank fixedly connecting said platform and airfoil to said dovetail, said dovetail being disposed in said disk slot for attaching said blade to said disk;
 each of said blade shanks including a pocket extending therein in an upstream direction from a downstream end surface thereof; and
 said platform including a forward end having a radius $R_1$ from a longitudinal centerline of said engine and said airfoil including a tip having a radius $R_2$ from said centerline, the radius ratio $R_1/R_2$ being less than about 0.5, and wherein adjacent ones of said blades are spaced a distance D between roots thereof, each of said blades having a root chord length C and the ratio C/D defines blade root solidity.

9. A bladed disk assembly according to claim 8 wherein said platform is sloped at an angle of about 20 degrees to about 35 degrees with respect to said longitudinal centerline.

10. A bladed disk assembly according to claim 8 wherein said blades are steel blades and said radius ratio is about 0.42.

11. A bladed disk assembly according to claim 8 wherein said blades are steel blades and said root solidity is greater than about 2.2.

12. A bladed disk assembly according to claim 8 wherein said blades are steel blades and said radius ratio is about 0.42, and said root solidity is equal to about 3.1.

13. A bladed disk assembly according to claim 8 wherein said blades are titanium blades and said radius ratio is less than about 0.34.

14. A bladed disk assembly according to claim 8 wherein said blades are titanium blades and said radius ratio is less than about 0.34, and said root solidity is greater than about 2.3.

15. A bladed disk assembly according to claim 8 wherein:
 said airfoil includes a tip, a root, a leading edge and a trailing edge; and
 said shank includes two oppositely facing lateral surfaces, and first and second oppositely facing end surfaces being generally aligned with said airfoil leading edge and trailing edge, respectively, said pocket extending from said shank second end surface toward said shank first end surface and between said platform and said dovetail, said pocket being generally triangular in shape and said shank second end surface comprising first and second spaced legs extending from said platform to said dovetail.

16. A bladed disk assembly according to claim 15 wherein said first and second legs are spaced farther apart at said platform than at said dovetail for providing increased bending stiffness in said shank.

17. A bladed disk assembly according to claim 15 wherein said shank second end surface has a concave shape being closer to said shank first end surface at a center portion thereof.

18. A bladed disk assembly according to claim 8 wherein said blades comprise steel and said root solidity is in the range of about 2.2 to about 3.1 and said radius ratio is in the range of about 0.5 to about 0.42.

19. A bladed disk assembly according to claim 8 wherein said blades comprise titanium blades and said root solidity is in the range of about 2.3 to about 3.5 and said radius ratio is in the range of about 0.5 to about 0.34.

20. A bladed disk assembly according to claim 8 wherein said rotor blades including said pockets provide acceptable LCF and HCF life limits of said bladed disk assembly in a gas turbine engine.

21. A bladed disk assembly according to claim 8 wherein said blade shank has a bending stiffness generally at least as great as that which would otherwise be realizable in said shank without said pocket.

* * * * *